(12) United States Patent
Guo et al.

(10) Patent No.: US 9,809,147 B2
(45) Date of Patent: Nov. 7, 2017

(54) POSITION-LIMITING DEVICE

(71) Applicant: CRRC QINGDAO SIFANG CO., LTD., Qingdao, Shandong (CN)

(72) Inventors: Jianqiang Guo, Shandong (CN); Xiaojun Deng, Shandong (CN); Shaoqing Liu, Shandong (CN); Zhaojin Sun, Shandong (CN); Junshan Lin, Shandong (CN); Bin Li, Shandong (CN); Yanju Zhao, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/119,371

(22) PCT Filed: Nov. 13, 2015

(86) PCT No.: PCT/CN2015/094564
§ 371 (c)(1),
(2) Date: Aug. 16, 2016

(87) PCT Pub. No.: WO2016/169250
PCT Pub. Date: Oct. 27, 2016

(65) Prior Publication Data
US 2017/0080845 A1    Mar. 23, 2017

(30) Foreign Application Priority Data

Apr. 20, 2015  (CN) .......................... 2015 1 0188873
Apr. 20, 2015  (CN) ..................... 2015 2 0239460 U

(51) Int. Cl.
*B60P 7/08*    (2006.01)
*B60P 7/13*    (2006.01)
(Continued)

(52) U.S. Cl.
CPC ...... *B60P 7/13* (2013.01); *B60P 7/06* (2013.01); *B61D 45/00* (2013.01)

(58) Field of Classification Search
CPC ................................ B60P 7/13; B61D 45/003
(Continued)

(56) References Cited

U.S. PATENT DOCUMENTS 3,210,038 A * 10/1965 Bader ....................... B60P 7/08
                                                          410/77
3,995,562 A * 12/1976 Nordstrom ................ B60P 7/13
                                                          410/79
(Continued)

FOREIGN PATENT DOCUMENTS

CN         1840383 A      10/2006
CN       101010236 A       8/2007
(Continued)

OTHER PUBLICATIONS

International Search Report for PCT/CN2015/094564, dated Jan. 20, 2016, ISA/CN.
(Continued)

*Primary Examiner* — Stephen Gordon
(74) *Attorney, Agent, or Firm* — Yue Xu; U.S. Fairsky LLP

(57) ABSTRACT

A position-limiting device includes a base and a position-limiting member rotatably provided on the base, the position-limiting device further includes a positioning member. The base has a hollow portion. The position-limiting member is switchable between a position-limiting state and a non-position-limiting state, when the position-limiting member is in the position-limiting state, the positioning member fixes the position of the position-limiting member; and when the position-limiting member is in the non-position-limiting state, the positioning member releases the position-limiting member, and at least a part of the position-limiting member is received in the hollow portion. The position-limiting member can switch between the position-limiting state and the non-position-limiting state, and the positioning member can fix the position of the position-limiting member and release the position-limiting member; and in the non-position-limiting state, at least a part of the (Continued)

position-limiting member is received in the hollow portion of the base.

7 Claims, 1 Drawing Sheet

(51) Int. Cl.
   *B60P 7/06* (2006.01)
   *B61D 45/00* (2006.01)

(58) Field of Classification Search
   USPC ...... 410/69, 77–80, 94; 105/355; 244/118.1, 244/137.1; 248/500, 503
   See application file for complete search history.

(56) References Cited

U.S. PATENT DOCUMENTS

| | | |
|---|---|---|
| 4,349,302 A | 9/1982 | Ferguson, Jr. |
| 5,816,758 A | 10/1998 | Huber |
| 6,485,238 B2 * | 11/2002 | Segura ................. B60P 7/13 410/69 |
| 6,729,818 B1 | 5/2004 | Yee et al. |
| 2007/0253790 A1 | 11/2007 | Boggenstal et al. |
| 2008/0170925 A1 | 7/2008 | Marmur |
| 2009/0252568 A1 | 10/2009 | Morin |
| 2013/0251473 A1 | 9/2013 | Metternich |

FOREIGN PATENT DOCUMENTS

| | | |
|---|---|---|
| CN | 102933424 A | 2/2013 |
| CN | 104442878 A | 3/2015 |
| CN | 104802817 A | 7/2015 |
| CN | 204605817 U | 9/2015 |
| DE | 20005213 U1 | 7/2001 |
| EP | 0753457 A2 | 1/1997 |

OTHER PUBLICATIONS

English translation of the first office action for CN201510188873.4, dated Oct. 9, 2016.

* cited by examiner

US 9,809,147 B2

POSITION-LIMITING DEVICE

This application is the national phase of International Application No. PCT/CN2015/094564, titled "POSITION-LIMITING DEVICE", filed on Nov. 13, 2015, which claims the benefits of priorities to Chinese patent application No. 201510188873.4 titled "POSITION-LIMITING DEVICE" and filed with the Chinese State Intellectual Property Office on Apr. 20, 2015, and Chinese patent application No. 201520239460.X titled "POSITION-LIMITING DEVICE" and filed with the Chinese State Intellectual Property Office on Apr. 20, 2015, the entire disclosures of which are incorporated herein by reference.

FIELD

The present application relates to a position-limiting device.

BACKGROUND

In cargo transportation, in order to limit the position of objects such as cargos, a position-limiting device is often used. At present, a high-speed railway freight (using high-speed freight motor train unit) has competitive advantages of being faster than ordinary trains and having a lower cost than air transportation. In the states represented by France and Germany, the high-speed railway freight has been developed starting from services such as delivering express mails and packages.

A common manner for loading and securing cargos in a conventional railway freight (Luggage and Parcel Express Special Train) is described as follows. Cargos are loaded and unloaded by workers, parcels are loaded in bulk (on the floor of a cargo compartment) and are stacked in a joint-covering stacking type or a trapezoid stacking type, and instead of being secured, the stacked cargos are tightly pressed against each other. In order to secure cargos on the high-speed freight motor train unit, it is required to realize the modularized unitizing and the quick loading and securing of the cargos, to ensure the safety and reliability of the transportation. In order to achieve the quick loading and securing of the modularized and unitized unit in the cargo compartment, two functions are particularly required to be achieved along a running direction of the train, the first function is to manually convey the unitized unit in a track, and the second function is to longitudinally limit the position of the unitized unit after being pushed to a designated position. The first function requires that the position-limiting device can be turned down to avoid interfering with the conveying process, and the second function requires that the position-limiting device can be turned up to limit the position of the unitized unit and meet the strength requirement. Thus, in order to meet the requirements of the freight, especially the high-speed railway freight, it is necessary to make improvements to address the above defects of the conventional technology.

SUMMARY

A main object of the present application is to provide a position-limiting device, and the position-limiting device has a simple structure, is convenient to operate, has a reliable effect, and can well meet the requirements of quick loading and securing of cargos.

In order to achieve the above object, a position-limiting device is provided according to the present application, which includes a base and a position-limiting member rotatably arranged on the base. The position-limiting device further includes a positioning member, the base has a hollow portion; the position-limiting member is switchable between a position-limiting state and a non-position-limiting state, in a case that the position-limiting member is in the position-limiting state, the positioning member fixes a position of the position-limiting member; and in a case that the position-limiting member is in the non-position-limiting state, the positioning member releases the position-limiting member, and at least a part of the position-limiting member is received in the hollow portion.

Further, the position-limiting member has a main body portion and a position-limiting portion, the main body portion includes a first section and a second section, the first section has a first end rotatably arranged on the base and a second end connected to a first end of the second section, and a second end of the second section is connected to the position-limiting portion; and the second section and the position-limiting portion form a position-limiting area.

Further, the second section is a straight section, and the straight section and the position-limiting portion form a T-shaped structure.

Further, the position-limiting device further includes a first elastic member, and the first elastic member is configured to allow the position-limiting member to have a tendency of being switched from the position-limiting state to the non-position-limiting state.

Further, the first end of the first section is rotatably arranged on the base via a first rotating shaft, and the first elastic member is a first torsional spring sleeved on the first rotating shaft.

Further, the positioning member includes a first positioning member, a first end of the first positioning member is rotatably arranged on the base, and a second end of the first positioning member is a hook-shaped structure, the first section has a hollow portion, the hook-shaped structure is configured to pass through the hollow portion and hook a first side of the first section in the case that the position-limiting member is in the position-limiting state.

Further, the position-limiting device further includes a second elastic member, and the second elastic member is configured to allow the second end of the first positioning member to have a tendency of moving upward with respect to the base.

Further, the position-limiting device further includes a pedal, wherein the pedal is arranged on the first positioning member and is configured to allow the second end of the first positioning member to move downward with respect to the base under the action of an external force.

Further, the first end of the first positioning member is rotatably arranged on the base via a second rotating shaft, and the second elastic member is a second torsional spring sleeved on the second rotating shaft.

Further, the positioning member includes a second positioning member, the second positioning member has a first end fixedly arranged on the base and a second end configured to abut against a second side of the first section in the case that the position-limiting member is in the position-limiting state; and the first side and the second side are two opposite sides of the first section.

With the technical solutions of the present application, the position-limiting member can switch between the position-limiting state and the non-position-limiting state, and the positioning member can fix the position of the position-limiting member and release the position-limiting member; and in the non-position-limiting state, at least a part of the position-limiting member is received in the hollow portion of the base, thus the requirement of quick loading and securing can be well met.

BRIEF DESCRIPTION OF THE DRAWINGS

In order to more clearly illustrate the technical solutions in embodiments of the present application or in the conventional technology, accompanying drawings referred to describe the embodiments or the conventional technology are introduced simply hereinafter.

Obviously, the accompanying drawings in the following description are only a few embodiments of the present application, and for the person skilled in the art, other accompanying drawings can also be obtained based on these accompanying drawings without any creative work.

DETAILED DESCRIPTION

In order to make the objects, technical solutions and advantages of the embodiments of the present application to be more clear, the technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative effort, fall into the scope of the present application.

It should be noted that, the embodiments of the present application and the features in the embodiments can be combined with each other without causing conflicts.

In order to address the issues in the conventional technology, a position-limiting device is provided according to the present application, which includes a base and a position-limiting member rotatably arranged on the base, the position-limiting device further includes a positioning member. The base has a hollow portion. The position-limiting member is switchable between a position-limiting state and a non-position-limiting state. When the position-limiting member is in the position-limiting state, the positioning member fixes the position of the position-limiting member; and when the position-limiting member is in the non-position-limiting state, the positioning member releases the position-limiting member, and at least a part of the position-limiting member is received in the hollow portion.

With the technical solutions of the present application, the position-limiting member can switch between the position-limiting state and the non-position-limiting state, and the positioning member can fix the position of the position-limiting member and release the position-limiting member; and in the non-position-limiting state, at least a part of the position-limiting member is received in the hollow portion of the base, thus the requirement of quick loading and securing can be well met.

Figure 1:
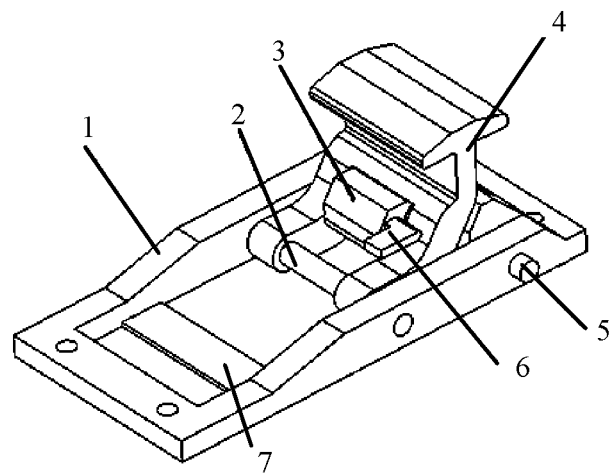
FIG. 1 is a schematic view showing the structure of a position-limiting device according to an embodiment of the present application.

FIG. 1 shows a schematic view of the structure of a position-limiting device according to an embodiment of the present application. FIG. 1 shows a schematic view of the structure of a position-limiting device according to an embodiment of the present application and shows a part of a position-limiting member 4 in a sectional view to present the structure of a first positioning member 3.

As shown in FIG. 1, in an embodiment of the present application, the position-limiting device includes a base 1 and a position-limiting member 4, and the position-limiting member 4 is rotatably arranged on the base 1. The base 1 has a hollow portion. For example, the base 1 may be a square frame structure, and the square frame structure is formed by side plates on a left side and a right side and end plates on a front end and a rear end of the frame structure, and a central part of the frame structure is the hollow portion.

It should be noted that, in FIG. 1, the front-rear direction refers to a forward-backward direction (i.e., the left and right direction in FIG. 2) during the cargo conveying process, and the left-right direction is defined by taken the forward direction (i.e., the leftward direction in FIG. 2) during the cargo conveying process as a reference.

Also, the position-limiting device may further include a positioning member. Since the position-limiting member 4 is rotatably arranged on the base 1, the position-limiting member 4 is configured to be switchable between a position-limiting state and a non-position-limiting state. When the position-limiting member 4 is in the position-limiting state, the positioning member fixes the position of the position-limiting member 4, to keep the position-limiting member 4 in the position-limiting state. When the position-limiting member 4 is in the non-position-limiting state, the positioning member releases the position-limiting member 4, and at least a part of the position-limiting member 4 is received in the hollow portion.

Further, the position-limiting member 4 may have a main body portion and a position-limiting portion. The main body portion includes a first section and a second section connected to each other. The first section has a first end rotatably arranged on the base 1 and a second end connected to a first end of the second section, and a second end of the second section is connected to the position-limiting portion.

The second section and the position-limiting portion form a position-limiting area. Thus, the position-limiting area may limit at least a part of the cargo or at least a part of a carrier for the cargo (e.g., a container or a pallet) in the position-limiting area, thereby achieving its position-limiting function. Preferably, at least a part of a junction, where the second section and the position-limiting portion are connected, can form a right-angled position-limiting area, thereby facilitating exerting the position-limiting effect of the position-limiting area.

The second section may be a straight section. The straight section and the position-limiting portion may constitute a T-shaped structure. Thereby, a junction, where the second section and the position-limiting portion are connected, forms two right-angled position-limiting areas, thereby effectively limiting the positions of objects at the front side and the rear side at the same time.

The position-limiting device may further include a first elastic member, and the first elastic member is configured to allow the position-limiting member 4 to have a tendency of being switched from the position-limiting state to the non-position-limiting state. Thereby, under the action of an elastic force of the first elastic member, the position-limiting member 4 always has a tendency of turning from an upright position-limiting state to a flat non-position-limiting state. Once the position-limiting member 4 is released by the positioning member, the position-limiting member 4 may automatically turn to the non-position-limiting state.

Reference is made to FIG. 1, the first end of the first section of the main body portion of the position-limiting member 4 may be rotatably arranged on the base 1 by a first rotating shaft 2. The first elastic member may be a first torsional spring sleeved on the first rotating shaft 2. Apparently, besides the first torsional spring, the first elastic member may be embodied as other forms of springs, for example, a tension spring having one end connected to the base 1 and another end connected to the position-limiting member 4, and the first elastic member may also be embodied as other forms of components and/or mechanisms having elastic members.

Figure 2:
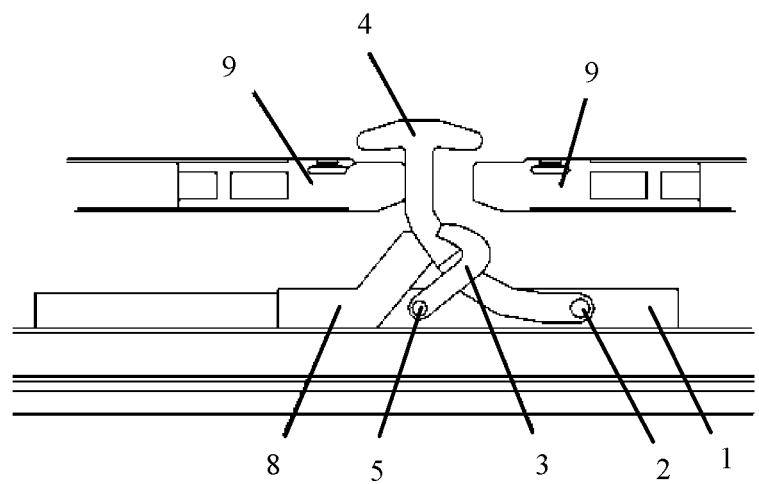
FIG. 2 is a schematic view showing the structure of the position-limiting device in use according to the embodiment of the present application.

As shown in FIGS. 1 and 2, the positioning member may include a first positioning member 3. A first end of the first positioning member 3 is rotatably arranged on the base 1, and a second end of the first positioning member 3 is a hook-shaped structure. The first section of the main body portion of the position-limiting member 4 has a hollow portion, and the hook-shaped structure is configured to pass through the hollow portion and hook a first side of the first section in the case that the position-limiting member 4 is in the position-limiting state.

Thereby, when the position-limiting member 4 is in the upright position-limiting state, the second end of the first positioning member 3 passes through the hollow portion in the first section of the main body portion of the position-limiting member 4, and the hook-shaped structure of the second end of the first positioning member 3 hooks the first side (i.e., a right side shown in FIG. 2) of the first section, thereby positioning the position-limiting member 4 in the position-limiting state. When the position-limiting member 4 is required to turn from the upright position-limiting state to the flat non-position-limiting state, firstly the hook-shaped structure needs to be disengaged from the first side of the first section and withdrew from the hollow portion, to allow the first positioning member 3 to release the position-limiting member 4, thus the position-limiting member 4 can smoothly turn to the non-position-limiting state.

The position-limiting device may further include a second elastic member, and the second elastic member is configured to allow the second end of the first positioning member 3 to have a tendency of moving upward with respect to the base 1. Thereby, under the action of an elastic force of the second elastic member, the second end of the first positioning member 3 always has a tendency of moving upward with respect to the base 1. Once the second end of the first positioning member 3 cooperates with the first section of the position-limiting member 4, the first positioning member 3 can reliably fix the position of the position-limiting member 4 with the elastic force of the second elastic member.

Reference is made to FIG. 2, the first end of the first positioning member 3 is rotatably arranged on the base 1 via a second rotating shaft 5, and the second elastic member is a second torsional spring sleeved on the second rotating shaft 5. Apparently, in addition to the second torsional spring, the second elastic member may also be embodied as other forms of springs, for example a spring having one end connected to the base 1 and another end connected to the first positioning member 3, and the second elastic member may also be embodied as other forms of components and/or mechanisms having elastic members.

Furthermore, as shown in FIG. 1, the position-limiting device may further include a pedal 6. The pedal 6 is arranged on the first positioning member 3 and is configured to allow the second end of the first positioning member 3 to move downward with respect to the base 1 under the action of an external force. For example, when the pedal 6 is stepped by an operator, the second end of the first positioning member 3 moves downward with respect to the base 1, and meanwhile the position-limiting member 4 turns to the non-position-limiting state, thereby allowing the first positioning member 3 to release the position-limiting member 4.

As shown in FIG. 2, the positioning member may further include a second positioning member 8. The second positioning member 8 has a first end fixedly arranged on the base 1 and a second end configured to abut against a second side of the first section in the case that the position-limiting member 4 is in the position-limiting state. The first side and the second side are respectively two opposite sides of the first section, i.e., a left side and a right side of the first section of the main body portion of the position-limiting member 4 in FIG. 2.

Preferably, as shown in FIGS. 1 and 2, the first section of the main body portion of the position-limiting member 4 may be an arc-shaped section. With this structure, in the case that the second positioning member 8 is provided, the second positioning member 8 in the position-limiting state may abut against the second side of the arc-shaped section, that is, abuts against an arc-shaped surface, thereby increasing the stability of the positioning. Furthermore, by configuring the first section as the arc-shaped section, the height of the entire position-limiting device in the case that the position-limiting member 4 is in the flat non-position-limiting state can be reduced as far as possible, thus facilitating cargos or a carrier for the cargos (e.g., a container or a pallet) to pass above the position-limiting device.

In order to increase the structural strength of the base 1, as shown in FIG. 1, a reinforcing plate 7 may be provided in the hollow portion of the base 1. The number of the reinforcing plate may be one or more and may be determined according to practical requirements.

The base 1 may be provided with a fixing mechanism for fixing the base 1. The fixing mechanism may include a mounting countersink and a bolt hole provided in the mounting countersink. The mounting countersink may ensure that a bolt mounted in the bolt hole will not be higher than an upper surface of the base 1, to avoid an interference with an object supported on the base 1.

FIG. 2 shows a schematic view of the structure of the position-limiting device in use according to the embodiment of the present application. As shown in FIG. 2, when the position-limiting member 4 of the position-limiting device is in the position-limiting state, the position-limiting member 4 can limit the positions of two pallets 9 (on which containers or other cargos may be placed) at the same time, in this case, a right end of the pallet 9 at the left and a left end of the pallet 9 at the right respectively enter into two position-limiting areas of the T-shaped structure described hereinabove, thereby limiting the positions of the pallets 9.

Reference is made to FIGS. 1 and 2, when the two pallets 9 are moved away, and the position-limiting member 4 of the position-limiting device is required to be switched to the non-position-limiting state, an operator may step on the pedal 6 to overcome the elastic force of the second elastic member, to allow the second end of the first positioning member 3 to move downward, and meanwhile, the position-limiting member 4 turns to the non-position-limiting state under the action of the first elastic member or a manual force, thus, the position-limiting member 4 is released by the first positioning member 3, and then the position-limiting member 4 continues to turn until at least a part of the position-limiting member 4 is received in the hollow portion of the base 1.

According to the above description, it can be seen that the above embodiments of the present application can achieve technical effects as follows. The device has a simple structure, and is easy to use and maintain; the device has a high carrying capacity and meets the requirements of position-limiting and carrying; the device can turn down in the non-position-limiting state to facilitate conveying unitized units; the device can be fixed after turning up, to provide a reliable and effective position-limiting effect; the unlocking operation is convenient, thus effectively increasing the operation efficiency, and greatly increasing the speed of loading and unloading the cargos, and reducing the time cost.

Moreover, the position-limiting device provided by the present application can achieve three objects for unitized units in the cargo compartment. First, the unitized units (cargos) can be longitudinally limited at a fixed position, thus, when being subjected to an overload shock not less than 5 g in a running direction of the train, the device will not fail, and a lightweight design is also considered. Second, when the cargo is conveyed along the length direction of the cargo compartment, the position-limiting device can be turned down to facilitate the passage of the cargo over the position-limiting device. Thirdly, a flexible and reliable locking and unlocking can be achieved by the operation of the position-limiting device.

The position-limiting device provided by the present application is applicable to common freight transportation, particularly applicable to a freight transportation of the freight motor train unit, especially applicable for limiting and securing the pallet on which a container or other cargos are placed, thereby achieving a quick loading and unloading of the cargos.

The position-limiting device of the present application has been described according to the above embodiments; however, the position-limiting device is not limited to the components and/or the connection relationships described in the above embodiments. For example, the base is not limited to the rectangular frame structure; the structures and arrangements of the position-limiting member and the positioning member are not limited to those described in the above embodiments, as long as the position-limiting member can turn to be switched between the position-limiting state and the non-position-limiting state, and the positioning member can position and release the position-limiting member; the first elastic member and the second elastic member are not limited to a torsional spring, and can be various mechanisms/components that can provide the required elastic force.

The above descriptions are only preferred embodiments of the present application, and are not deemed to limit the present application. For those skilled in the art, the present application may have various modifications and variations. Any modifications, equivalent replacements and improvements made within the spirit and principle of the present application should fall into the scope of the present application.

What is claimed is:

1. A position-limiting device, comprising a base and a position-limiting member rotatably arranged on the base, wherein the position-limiting device further comprises a positioning member, the base has a hollow portion; the position-limiting member is switchable between a position-limiting state and a non-position-limiting state, in a case that the position-limiting member is in the position-limiting state, the positioning member fixes a position of the position-limiting member; and in a case that the position-limiting member is in the non-position-limiting state, the positioning member releases the position-limiting member, and at least a part of the position-limiting member is received in the hollow portion; and wherein, the position-limiting member has a main body portion and a position-limiting portion, the main body portion comprises a first section and a second section, the first section has a first end rotatably arranged on the base and a second end connected to a first end of the second section, and a second end of the second section is connected to the position-limiting portion; and the second section and the position-limiting portion form a position-limiting area;

wherein, the positioning member comprises a first positioning member, a first end of the first positioning member is rotatably arranged on the base, and a second end of the first positioning member is a hook-shaped structure, the first section has a hollow portion, the hook-shaped structure is configured to pass through the hollow portion of the first section and hook a first side of the first section in the case that the position-limiting member is in the position-limiting state; and wherein, the positioning member comprises a second positioning member, the second positioning member has a first end fixedly arranged on the base and a second end configured to abut against a second side of the first section in the case that the position-limiting member is in the position-limiting state; and the first side and the second side are two opposite sides of the first section.

2. The position-limiting device according to claim 1, wherein the second section is a straight section, and the straight section and the position-limiting portion form a T-shaped structure.

3. The position-limiting device according to claim 1, further comprising a first elastic member, wherein the first elastic member is configured to allow the position-limiting member to have a tendency of being switched from the position-limiting state to the non-position-limiting state.

4. The position-limiting device according to claim 3, wherein the first end of the first section is rotatably arranged on the base via a first rotating shaft, and the first elastic member is a first torsional spring sleeved on the first rotating shaft.

5. The position-limiting device according to claim 1, further comprising an elastic member of the first positioning member, wherein the second elastic member of the first positioning member is configured to allow the second end of the first positioning member to have a tendency of moving upward with respect to the base.

6. The position-limiting device according to claim 5, further comprising a pedal, wherein the pedal is arranged on the first positioning member and is configured to allow the second end of the first positioning member to move downward with respect to the base under the action of an external force.

7. The position-limiting device according to claim 5, wherein the first end of the first positioning member is rotatably arranged on the base via a rotating shaft of the first positioning member, and the elastic member of the first positioning member is a torsional spring sleeved on the rotating shaft of the first positioning member.

* * * * *

UNITED STATES PATENT AND TRADEMARK OFFICE
CERTIFICATE OF CORRECTION

PATENT NO.         : 9,809,147 B2
APPLICATION NO.    : 15/119371
DATED              : November 7, 2017
INVENTOR(S)        : Jianqiang Guo et al.

Page 1 of 1

It is certified that error appears in the above-identified patent and that said Letters Patent is hereby corrected as shown below:

In the Claims

At Column 8, Line 49, Claim 5 Line 3 the term "the second elastic member" should be replaced with the term "the elastic member".

Signed and Sealed this
Nineteenth Day of June, 2018

Andrei Iancu
*Director of the United States Patent and Trademark Office*